United States Patent
Maus et al.

(10) Patent No.: US 6,290,882 B1
(45) Date of Patent: Sep. 18, 2001

(54) REDUCED-KNITLINE THERMOPLASTIC INJECTION MOLDING USING MULTI-GATED NON-SEQUENTIAL-FILL METHOD AND APPARATUS, WITH A HEATING PHASE AND A COOLING PHASE IN EACH MOLDING CYCLE

(75) Inventors: Steven M. Maus, New Braunfels, TX (US); George J. Galic, Columbia Heights, MN (US); John R. Filipe, Fairport, NY (US)

(73) Assignee: Galic Maus Ventures LLP, Columbia Heights, MN (US)

( * ) Notice: Subject to any disclaimer, the term of this patent is extended or adjusted under 35 U.S.C. 154(b) by 0 days.

(21) Appl. No.: 09/327,755

(22) Filed: Jun. 7, 1999

(51) Int. Cl.$^7$ ..................................... B29D 11/00
(52) U.S. Cl. ............... 264/2.2; 264/40.6; 264/328.7; 264/328.8; 264/328.16; 425/144; 425/162; 425/548; 425/552; 425/555; 425/573; 425/808; 425/810
(58) Field of Search .................... 264/1.1, 2.2, 2.5, 264/40.6, 328.7, 328.8, 1.9, 328.16; 425/808, 555, 573, 810, 144, 162, 548, 552, 143; 249/116, 134, 135

(56) References Cited

U.S. PATENT DOCUMENTS

| | | | |
|---|---|---|---|
| 4,008,031 | * 2/1977 | Weber | 264/2.2 |
| 4,560,342 | * 12/1985 | Ishida et al. | 264/1.1 |
| 4,793,953 | 12/1988 | Maus | 264/2.5 |
| 4,828,769 | 5/1989 | Maus | 264/1.3 |
| 4,900,242 | 2/1990 | Maus | 425/149 |
| 4,925,161 | 5/1990 | Allan | 264/69 |
| 4,963,312 | 10/1990 | Muller | 264/327 |
| 4,965,028 | * 10/1990 | Maus et al. | 264/328.7 |
| 4,994,220 | 2/1991 | Gutjahr | 264/69 |
| 5,017,311 | 5/1991 | Furusawa | 264/23 |
| 5,055,025 | 10/1991 | Muller | 425/144 |
| 5,069,840 | 12/1991 | Arnott | 264/69 |
| 5,093,049 | 3/1992 | Uehara | 264/2.2 |
| 5,135,703 | 8/1992 | Hunerberg | 264/572 |
| 5,156,858 | 10/1992 | Allan | 425/145 |
| 5,160,466 | 11/1992 | Allan | 264/69 |
| 5,192,555 | 3/1993 | Arnott | 425/544 |
| 5,225,136 | 7/1993 | Furugohri | 264/328.8 |
| 5,376,313 | 12/1994 | Kanewske, III | 264/1.1 |
| 5,376,317 | 12/1994 | Maus | 264/40.6 |

(List continued on next page.)

Primary Examiner—Mathieu D. Vargot

(57) ABSTRACT

Hard to fill large-surface-area parts and/or thinwalled configurations of optical lenses and reflective optical elements are among the difficult-to-mold thermoplastic products which require precision replication of the molding surfaces, in micro detail. We combine multiple opposing gates (to reduce the meltflow pathlength) with non-isothermal steps of firstly, heating these mold surfaces (with circulating heat transfer fluids supplied by a hot side supply system, to a temperature setpoint sufficiently high to retard solidification), then secondly, injecting the melt through these opposing gates, then thirdly, rapidly cooling to solidification (by circulating heat transfer fluids of much lower temperature, supplied from a cold side supply system). To run fastest injection molding cycle time, the fast heating phase comes from combining high-thermal-conductivity copper alloy mold cavity materials with very large thermal driving force (high "delta T") from high-heat-transfer-rate fluids (preferably, steam). Fluid control units and electronic process sequence control units are interconnected to govern the flow of these fluids into and out of the injection mold and the supply systems in accordance with the predetermined logic of the process flowsheet. To reduce geometric constrictiveness during filling of the mold cavity, an injection compression process sequence with pre-enlarged variable-volume mold cavity can be created before injection starts, then compressed toward original dimensions during injection.

21 Claims, 5 Drawing Sheets

U.S. PATENT DOCUMENTS

| | | | |
|---|---|---|---|
| 5,399,303 | 3/1995 | Yamaguchi | 264/40.5 |
| 5,415,817 * | 5/1995 | Shiao et al. | 264/2.2 |
| 5,538,413 | 7/1996 | Gardner | 425/145 |
| 5,605,707 | 2/1997 | Ibar | 425/144 |
| 5,762,855 | 6/1998 | Betters | 264/328.8 |
| 5,762,972 | 6/1998 | Byon | 425/144 |
| 5,766,654 | 6/1998 | Groleau | 425/555 |

* cited by examiner

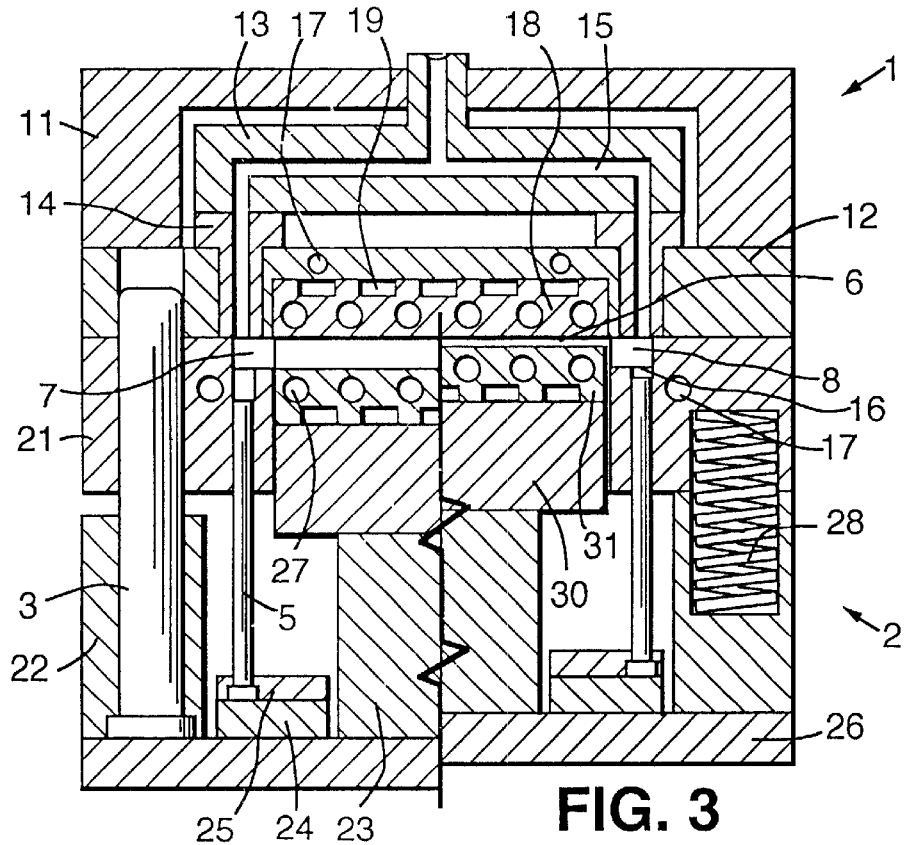
FIG. 3
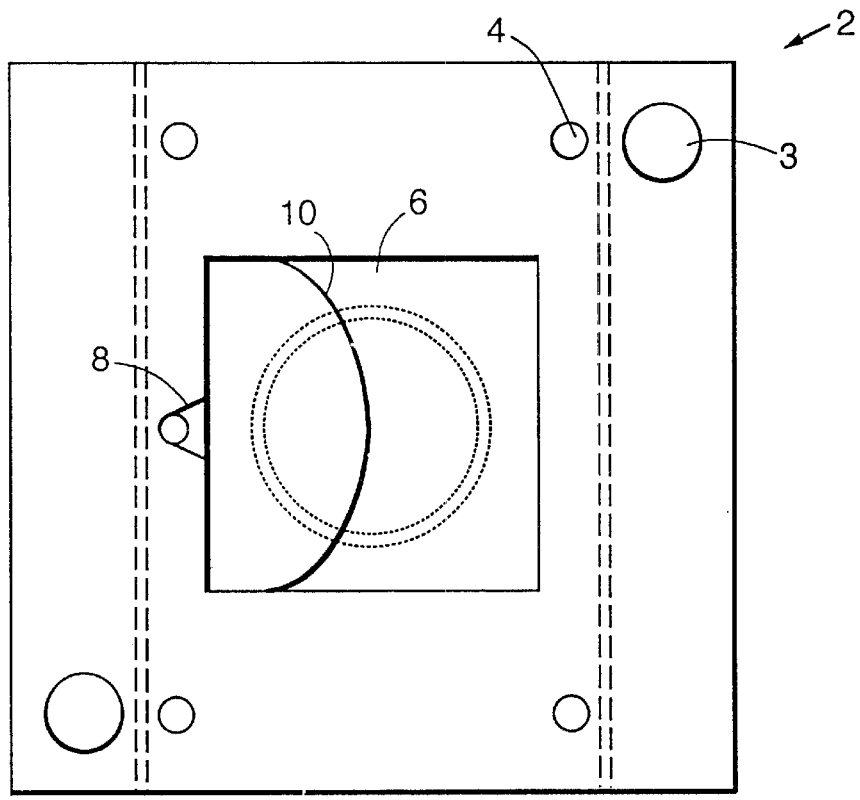
COMPARATIVE EXAMPLE FIG. 4

REDUCED-KNITLINE THERMOPLASTIC INJECTION MOLDING USING MULTI-GATED NON-SEQUENTIAL-FILL METHOD AND APPARATUS, WITH A HEATING PHASE AND A COOLING PHASE IN EACH MOLDING CYCLE

FIELD OF THE INVENTION

The present invention relates to an improved method and apparatus for thermoplastic injection molding using multiple substantially-opposing edge gates, to mold hard-to-fill product configurations without objectionable knitlines or unsatisfactory molded-surface replication, by starting each molding cycle with mold surfaces heated with circulating heat transfer fluid to retard melt solidification before starting injection, then cooling with circulating heat transfer fluid of a lower temperature source after the mold is filled to solidify the thermoplastic before opening the mold.

BACKGROUND OF THE INVENTION

Optical moldings are particularly limited by the prior art. The present invention may be used in optical-grade thermoplastic molded products such as edge-gated Rx spectacle lens, plano eyewear, instrument optical lenses & prisms, flat-panel display lenses, information bearing optical data cards, halographic displays, reflective and/or transmissive optics, precision molded plastic mirrors, refractive optical elements with a light bending function using multiple concentrically arrayed facets (such as fresnels) or multiple molded lenslet arrays. Even very large shapes such as fresnel- or mirror-type solar collector panels, or front/rear projection screens, or automotive windows could be uses.

The limitations learned from the below-mentioned patents drove us to look at ways to overcome filling problems. Typical computer simulation software would show filling problems, if the meltflow pathlength was too long, or the aspect ratio is too high. Such product configurations have a large aspect ratio for filling, defined as the length of the meltflow pathlength divided by the cross-sectional thickness. Conventional alternatives all have drawbacks if the mold cavity has just 1 gate, even if centrally located. Substituting lower melt viscosity resin with less molecular weight or less reinforcement gives poorer properties to the molded part. Substituting thicker cross-sectioned part gives slower cycle time & higher material costs to the molded part. lower melt viscosity resin or thicker molecular weight. Thus, in search of a way to get shorter meltflow pathlength and lower aspect ratios, multiple gates can be spaced out along the perimeter of the mold cavity. However, when the resulting multiple meltfronts converge and intersect, cosmetically unacceptable knitlines (visible surface flaws) and weldlines (internal weak-spots of poor mechanical strength are not created.

One approach to this problem is multi-gated sequential filling of injection molds for large-surface-area parts and/or thinwalled parts. Flow lengths are now shortened, but the knitlines can be avoided by opening one valve gate at a time. In this sequential fill, the meltfront from the first-to-be-opened gate must pass by the location of the second-to-be-opened gate before this second gate is opened, and so on. As each subsequent gate opens, its melt blends into melt from the previously-opened gates to ideally provide a single smoothly-flowing meltfront driven by multiple short-flowpath gates. No gate is opened to injection before the single smoothly-flowing meltfront has swept by, thus avoiding multiple meltfronts converging and intersecting in knitlines. A recent example of multi-gated sequential filling in Betters et al (U.S. Pat. No. 5,762,855 issued Jun. 9, 1998). It uses mechanically closed valve gates to keep the melt within the next shot at desirably high pressurizations, to avoid splay and other surface defects. It mentions briefly . . . "improved knitline appearance" . . . on column 2, line 18 without further elaboration or support. Another example of multi-gated sequential filling is Hunerberg et al (U.S. Pat. No. 5,135,703 issued Aug. 4, 1992), which also comprises gas injection behind the moving meltfront. Multi-gated sequential filling is reportedly successful in thinwalling opaque electronic housings (i.e. cellphones and laptops) and hard-to-fill large opaque automotive moldings (i.e. bumpers and body panels), but no known optical lenses use it.

A different prior art approach teaches to allow knitlines and weldlines to form, but then to use a plurality of substantially opposing gates to alternately pressurize and depressurize the melt, in coordination with ohe another. So, when one gate is acting to pressurize against the melt, its opposing gate is depressurizing. Then in accordance with a programmed control, they switch roles. And so on, such that at the original intersection of the 2 opposing meltfronts, shearing forces may cause molecular entanglements while the melt is still mobile. Such reciprocating "push-pull" forces are believed to strengthen the weldlines (internal weak-spots of poor mechanical strength) and improved fiber reinforcement orientation. One of the better-known such "multi live feed" approaches is offered by Cinpres, (Allan et al, U.S. Pat. No. 4,925,161 issued May 15, 1990, U.S. Pat. No. 5,156,858 issued Oct. 20, 1992 and U.S. Pat. No. 5,160,466 issued Nov. 3, 1992), in its "Scorim" process available for licensing. Similar in effect but requiring 2 separate injection barrels to implement in Klockner's approach, per Gutjahr et al (U.S. Pat. No. 4,994,220 issued Feb. 19, 1991), dealing with improved orientation of liquid chrystal polymers. Also similar in effect but perhaps with simpler hardware (requires only injection barrel to implement, and capable of running multiple mold cavities) is Husky's approach, per Arnott (U.S. Pat. No. 5,069,840 method patent issued Dec. 3, 1991; U.S. Pat. No. 5,192,555 apparatus patent issued Mar. 9, 1993). Thermold employs an accumulator between plastication and mold, in Ibar (U.S. Pat. No. 5,605,707 issued Feb. 25, 1997). Other newer ones attempting to be similar in effect by trying to act locally upon just the weldline include Groleau (U.S. Pat. No. 5,766,654 issued Jun. 16, 1998), and Gardner et al (U.S. Pat. No. 5,538,413 issued Jul. 23, 1996) both employing reciprocating "packing pins" located beneath the weldline to pulse, and Furugohri et al (U.S. Pat. No. 5,225,136 issued Jul. 6, 1993), employing a "well" as a controllable reservoir for molten resin, located between the gate and the weldline, to . . . "cause migration of the resin at the weld". However, it is believed that none of these "multi live feed" approaches are successfully employed to the optical lens molder's problems of how to eliminate cosmetically unacceptable knitlines (surface flaws) on the usable portion of transparent amorphous thermoplastic molded lenses. Inasmuch as each of these "multi live feed" approaches still predicates that the multiple meltfronts converge and intersect, they can only remedy the weldlines (internal weak-spots of poor mechanical strength) after they are now created.

All of the above-mentioned multi-gated sequential filling and "multi live feed" approaches are still running substantially isothermally, with respect to the measured temperature of the injection mold cavity blocks and circulating coolant therein. That is to say, those metal mold temperatures and coolant temperatures are always set well below the glass transition temperature Tg of the amorphous thermoplastic throughout the whole injection molding cycle.

Such is also true of the only prior art reference known to Applicants, wherein at least 2 opposing gates are employed to feed a transparent amorphous thermoplastic melt into a single mold cavity, to improve filling and packing of an optically-functioning molding. Kanewske III et al (U.S. Pat. No. 5,376,313 issued Dec. 27, 1994) is molding a lowcost disposible testtube-shaped plastic assay cuvette from . . . "acrylic, polystyrene, styrene-acrylontrile, polycarbonate . . . " (col. 9, ln 51–2) at . . . "temperature of the mold cavity 508 is preferably from between about 100 F. and about 140 F.; and the temperature of the mold core 504 is preferably from between about 60 F. and about 100 F." . . . (col. 9, ln 63–67), all of which are very far below the Tg of any of their resins mentioned. In order to get the desired low levels of molded-in stresses in the "optical read region" (through which absorbance of a known light beam is measured), this patent says that it was necessary to locate the gate at least some minimum distance away from "optical read region", and since this reduces ease of filling, the preferred embodiment employs at least 2 such gates at substantially opposing locations with substantially simultaneous injection into both (presumably, to maintain symmetry). This patent is silent on the presence of a knitline, but those skilled in the art would expect a very long knitline.

Let us now move away from these prior art approaches which are still running substantially isothermally. Various "non-isothermal" prior art approaches have already been previously cited by Applicants in our U.S. Pat. No. 5,376,317 (Maus et al) issued Dec. 27, 1994, incorporated herein by reference. In the USPTO examination of U.S. Pat. No. 5,376,317, the closest prior art was determined to be Muller (U.S. Pat. No. 4,963,312 (method) issued Oct. 16, 1990 and U.S. Pat. No. 5,055,025 issued Oct. 8, 1991 (apparatus)). Muller is drawn to thinwall packaging molding, which has somewhat different problems than Applicants' focus on optical lens and quality of microstructured replicated surfaces. Like Applicants, Muller heats the mold surface before injection, so as to overcome the melt's resistance to flow and to improve filling of its difficult product configurations. Unlike Applicants, Muller apparently constructed his mold cavity members without regard to their heat transfer rates (he is silent on his materials of construction; we assume tool steels), so to achieve fast cycle times, he chose to make his mold cavity members very thin, which then required him to stop flowing his circulating heat carrier and hold it at maximum static pressure . . . "during injection of plastic . . . for supporting the thinwalled members" (see his Abstract) against unwanted mechanical deflection. Applicants solved this problem by our choice of materials of construction and sufficient thicknesses of same for proper loadbearing, so our heat transfer fluid can continue flowing through the mold during filling and packing phases of the molding cycle.

In addition to those cited "non-isothermal" prior art approaches, there are a couple newer ones which need to be commented on.

Yamaguchi et al (U.S. Pat. No. 5,399,303 issued Mar. 21, 1995) is drawn to a similar field—optical lenses—as Applicants, but with a very different sequence of method steps . . . "filling resin in a metal mold held at a temperature lower than a glass transition temperature of the resin, then pressurizing the resin under comparatively high pressure so as to expedite hardening of the resin by raising its glass transition temperature, then reducing the pressurization of the resin to comparatively low pressure, and increasing, generally in association, the temperature of the mold cavity surface higher than the glass transition temperature of the resin so as to form a molten layer on a front face of the resin surface, and finally raising the pressurization of the resin to a medium pressure and lowering, generally in association, the cavity surface temperature of the metal mold so a to reduce the temperature for the withdrawal of the product" . . . (see Yamaguchi's Abstract). In this sequence of steps, Yamaguchi resembles the Uehara (U.S. Pat. No. 5,093,049 issued March 1992) cited in our U.S. Pat. No. 5,376,317. By this sequence of steps, Yamaguchi does nothing to prevent the formation of knitlines or weldlines, were he to have been running myopic-prescription polycarbonate Rx spectacle lenses having thin centers and thick edges. Once the knitline is formed on the molded lens surface, merely re-heating per Yamaguchi . . . "so as to form a molten layer on a front face of the resin surface" . . . will not be adequate to remove the objectionable knitline. Nor does Yamaguchi teach the benefits of reducing geometric resistance to filling (like Applicants' use of variable volume mold cavity with injection compression sequence), nor reducing meltflow pathlength (like Applicants' use of opposing gates).

Byon (U.S. Pat. No. 5,762,972 issued Jun. 9, 1998) is not drawn to a similar field—optical lenses—as Applicants, but rather general problems of filling. Byon heats the mold before injection (by induction) to improve the fluidity of the resin melt, so there is no need to increase injection pressure. He does so by induction because it is faster than by the heat pipes employed in his cited prior art. Only very briefly is there any mention of weldlines, and no mention of knitlines . . . the fluidity of the resin fluid filling up the cavity is increased. In addition to these, the luster of the product is enhanced while reducing flow marks, weld lines, etc." (col. 4, ln 22–24). Byon is silent on the criticality of heating the mold to at least the Tg. Apparently, he is satisfied by . . . "The rise in mold temperature inhibits the cooling of the flowing resin fluid to maintain the fluidity of the resin fluid, so that there is no need to increase the injection pressure" . . . (col. 2, ln 1–3). Also, Byon does not teach the benefits of reducing geometric resistance to filling (like Applicants' use of variable volume mold cavity with injection compression sequence), nor reducing meltflow pathlength (like Applicants' use of opposing gates).

SUMMARY OF INVENTION

The present invention is an improved method and apparatus for thermoplastic injection molding, using multiple substantially-opposing edge gates, to mold hard-to-fill product configurations without objectionable knitlines or unsatisfactory molded microstructured surface replication, by starting each molding cycle with mold surfaces heated with circulating heat transfer fluid to retard melt solidification before starting injection, then cooling with circulating heat transfer fluid of a lower temperature source after the mold is filled to solidify the thermoplasic before opening the mold. Applicants' present invention is believed to be an improvement on their previous invention, U.S. Pat. No. 5,376,317 (Maus et al) issued Dec. 27, 1994, incorporated herein by reference, from which several elements are drawn. This 1994 patent employs the concept of initially injecting molten thermoplastic into a mold cavity having surface temperature greater than the glass transition temperature (Tg)—for an amorphous thermoplastic polymer—or above the melting temperatures (Tm) for a—crystalline thermoplastic polymer. This 1994 patent has already been put to successful commercial use for optically transparent amorphous thermoplastics injection molded into certain optical lens and reflective optical elements. It has specifically shown enhanced quality of microstructured replicated surfaces. Compared to the conventional state of art, improved filling and packing (to gain best possible replication of mold surface microstructure) have been achieved. However, Applicants' 1994 U.S. Pat. No. 5,376,317 still has limitations in molding hard-to-fill product configurations without objectionable knitlines or unsatisfactory lack of fidelity in molded-surface replication. Large-surface-area parts and/or thinwalled parts which cannot be center-gated are hard to fill. Such configurations have a large aspect ratio for filling, defined as the length of the meltflow pathlength divided by the cross-sectional thickness.

The problem of hard to fill large-surface-area parts and/or thinwalled configurations was earlier addressed in part by Applicants' previous invention, U.S. Pat. No. 4,828,769 (Maus et al) issued May 9, 1989, also incorporated herein by reference. See FIG. 20, and columns 4–6. This method patent and its corresponding apparatus patent (U.S. Pat. No. 4,900,242 to Maus et al issued Feb. 13, 1990, also incorporated herein by reference) have also already been put to successful commercial use for optically transparent thermoplastics injection molded into certain optical lens and discs. These 2 patents use an injection compression process sequence wherein a pre-enlarged variable volume mold cavity is first created before injection starts, then this pre-enlarged variable volume mold cavity is secondly compressed toward original dimensions during injection. Increasing the mold cavity's height dimension by means of increasing distance between the opposing mold cavity surfaces will decrease aspect ratio during filling of said mold cavity and thereby reduce geometric constrictiveness during filling of the mold cavity. In one example, Applicants' 2 patents have been commercially successful in a center-gated example configuration of the newest DVD disc, mold to only half the normal CD thickness (0.6 mm vs. 1.2 mm), with a proportionately worse aspect ratio (120:1 for DVD vs. 60:1 for CD discs). In a different example, Applicants' 2 patents have also been commercially successful in an edge-gated example configuration, for myopic-prescription polycarbonate Rx spectacle lenses having thin centers (1.0 to 1.5 mm) and thick edges (7.0 to >10 mm), with minimal knitlines. However, even when Applicants' use of pre-enlarged variable volume mold cavity combined with injection-compression process, to reduce aspect ratio (as perceived by the melt during filling) in this application, a significant knitline (3 mm to 8 mm) can be seen opposite the gate at the lens' O.D. with the naked eye, and this knitline must then be cut away when the round molded lens blanks are cut down to fit into the spectacle frame. So, these 2 Applicants' injection-compression patents also have limitations in large-surface-area parts and/or thinwalled parts. So, the limitations learned from these 3 above-mentioned Applicants' patents drove us to look at other ways to overcome filling problems.

To summarize, Applicants now combine multiple opposing gates (to reduce the meltflow pathlength and thereby reduce aspect ratio) with non-isothermal steps of firstly, heating these mold surfaces (with circulating heat transfer fluids supplied by a hot side supply system, to a temperature setpoint sufficiently high to retard solidification), then secondly, injecting the melt through these opposing gates, then thirdly, rapidly cooling to solidification (by circulating heat transfer fluids of much lower temperature, supplied from a cold side supply system). Each injection molding cycle thus starts with a heating phase, wherein the fast rise in mold surface temperature comes from a combination of high-thermal-conductivity metal (preferably, copper alloy) mold cavity materials, plus a very large thermal driving force ("delta T") being supplied by the hot side supply system fluid (preferably, steam). Ideally, this fluid's temperatures are well above the melt-solidifying temperatures (Tg or Tm) characteristic to the thermoplastic. The heating phase and injection is then followed by a fast cooling phase, wherein molding surface temperature decrease is thermally driven (preferably also a large "delta T") by cold side supply system fluid (preferably cold water) temperatures well below the melt-solidifying temperatures (Tg or Tm) characteristic to the thermoplastic. The greater these temperature differences ("delta T") are, the faster this "non-isothermal" molding cycle will be.

To overcome the problems of poor mold surface replication by the molded thermoplastic article and, more specifically, to be able to maximize microreplication of the finest surface detail and contour (i.e. the fidelity of the molded part to the molding surface) we heat the mold cavity part forming surfaces at least above a characteristic solid-liquid phase-change temperature which is characteristic of the thermoplastic polymer. Since the most desirable of optically-clear thermoplastic polymers are amorphous in nature (especially, polycarbonate and acrylic), the preferred setpoint could be the glass transition temperature (Tg). (For crystalline thermoplastic polymers, another melt-state temperature would be its melting point (Tm). For either type of polymer, the preferred setpoint temperature would be sufficiently high so that the thermoplastic being molded is not form stable at any higher temperatures, then after the mold cavity has at least been completely filled by the molten thermoplastic and before the mold is opened at the parting line, mold surface temperature is dropped to below the Tg or Tm of that crystalline thermoplastic material. Although most optical uses do not use crystalline thermoplastics, new catalysts for polyolefins are changing their prior limitations. One possible use may be to mold the microstructured surface of large front/rear projection screens.)

Reduction of "knitlines" (and to a lesser extent, "weld lines") is another benefit of the present invention, as is the ability to mold large surface-projected-area parts in smaller injection molding machines having less clamp tonnage (due to less "brute force" high injection pressures being used to fill), less "wedge" (non-uniform part thickness) problems and more uniform packing and shrinkage (due to more balanced fill pattern and shorter flowpaths). Preferably, the mold surface temperature is maintained above Tg or Tm until the mold cavity is not only filled with melt but is sufficiently pressurized to reach a peak value for melt pressure as measured within the mold cavity. This preferred embodiment retards solidification of the plastic onto the mold surfaces at least until the maximum packing pressures withing the cavity has been attained, thereby forcing a still-mobile polymer molecule against the micro detail of the partforming surfaces of the mold cavity construction. Retarded solidification during mold cavity filling also minimizes the well-known problem of high melt pressure near the gate and much lower melt pressure near the end-of-fill cavity wall; this "hydraulic melt pressure drop" incurred during conventional injection filling causes a corresponding difference in volumetric % shrinkage and resulting mechanical inaccuracies and warpages.

From the plastic's perspective, it sees only the mold surface temperature; however, in operating the molding hardware to perform the present invention, one must take into consideration the existence of time delay between changes made to the apparatus and/or heat transfer media, before actual mold surface temperature changes occur. Therefore, a process sequence chart of mold surface temperature changes will inevitably lag at least a bit from the actual changes made which provide the driving forces for changes in the mold surface temperature. Larger thermodynamic driving forces reduce this delay time and minimize total molding cycle time when maximum temperature differentials exist between the heat transfer media and the mold surface temperature. Therefore, the preferred embodiments of the present invention deliberately maintain a high temperature differential ("delta T") as a means of speeding response time and converting changes made by the molding apparatus into changes perceived by the plastic (by means of changes induced in the molding surface temperatures, accordingly).

In order to start the molding cycle at an optimally hot mold surface temperature and subsequently to drop rapidly that mold surface temperature to quicken solidification after a predetermined point in the molding cycle is reached, and thereby to minimize a total molding cycle time while also maximizing molding productivity and output quality, the present invention necessarily must consider mold materials construction which have relatively good thermal conductivity and heat transfer coefficients, as well as thermal diffusivity (i.e., to minimize point-to-point temperature non-uniformities within the molding surface). Certain tool steels, for example, are substantially better in heat transfer than others; high alloy content steels such as stainless steels would NOT be preferred. For example, substituting a low alloy steel such as H13 or P20 in place of a high alloy stainless steel such as 420 grade provides some improvement; polishability and tarnish resistance of such non stainless steels can be enhanced by means of electroplated nickel or chromium coatings.

However, even higher productivity is achieved in a preferred embodiment using copper based alloys such as copper bronze (Ampcoloy 940 (tm) from Ampco) and beryllium copper alloys (Moldmax (tm) or Protherm (tm) alloys from Brush Wellman), or hardened aluminum alloys. One preferred optical mold construction would be of the type disclosed and claimed in applicants U.S. Pat. No. 4,793,953 issued Dec. 27, 1988, incorporated herein by reference. These preferred molds for optical thermoplastic high pressure molding combine the high surface polishability and mechanical damage resistance of electroplated nickel or chromium at the outward face of the mold cavity mold cavity support block with a high conductivity substrate metal such as low alloy beryllium copper (typically 2% or less of beryllium, and 98% or more copper) or similar copper alloys, although conceivably other well known high conductivity metals such as aluminum alloys could be used. (Similarly, precious metals such as silver and gold could conceivably be functional equivalents but too soft and too expensive). By joining the desired surface qualities of the plating with the desired mechanical (typically, a compressive yield strength of at least 50,000 psi is required for satisfactory injection mold cavity mold cavity support blocks, and 70,000–100,000 psi is preferred) and thermodynamic properties of the substrate, a resulting monolithic mold mold cavity support block well suited for operating the present invention process sequence is obtained. Another specially preferred combination uses Protherm (brandname from Brush Wellman, for genetic C17510 BeCu alloy) with a hard, wear-resistance TiN (titanium nitride) surface coating.

(We earlier discussed prior art Muller U.S. Pat. Nos. 4,963,312 & 5,055,025. He constructed his mold cavity members without regard to their heat transfer rates, so to achieve fast cycle times for non-optical thinwall packaging moldings, he must make his mold cavity members very thin, which then required him to stop flowing his circulating heat carrier and hold it at maximum static pressure to support his thinwalled members against unwanted mechanical deflection. Applicants solved that problem by our choice of materials of construction and sufficient thicknesses of same for proper loadbearing, so our heat transfer fluid can continue flowing through the mold during filling and packing phases of the molding cycle. It depends on the specific alloy, but the critical thickness dimension can be as little as 0.250 inch of metal, measured between the actual molding surface and the deepest cut of machined-in cooling channel.)

DESCRIPTION OF DRAWINGS

FIG. 3 shows in cross-sectional split view a preferred embodiment of a single-cavity injection mold of the present invention, with 2 opposing edge gates and machined-in mold cooling channels for circulating heat transfer fluid. To reduce geometric constrictiveness during filling of the mold cavity, an injection compression process sequence with pre-enlarged variable-volume mold cavity is shown. In the lefthand split view, the mold is seen before injection starts, with a greatly increased mold cavity height. In the righthand split view, the mold is seen after injection starts, with the mold cavity height having been compressed toward original dimensions during or after injection.

FIG. 4 shows in a plan view (into an open parting line) a single-cavity injection mold of the prior art, with only 1 conventional design edge gate. Note the single meltfront is partway through the filling step, as melt is being injected from the single edge gate.

DETAILED DESCRIPTION OF THE INVENTION

Figure 1:
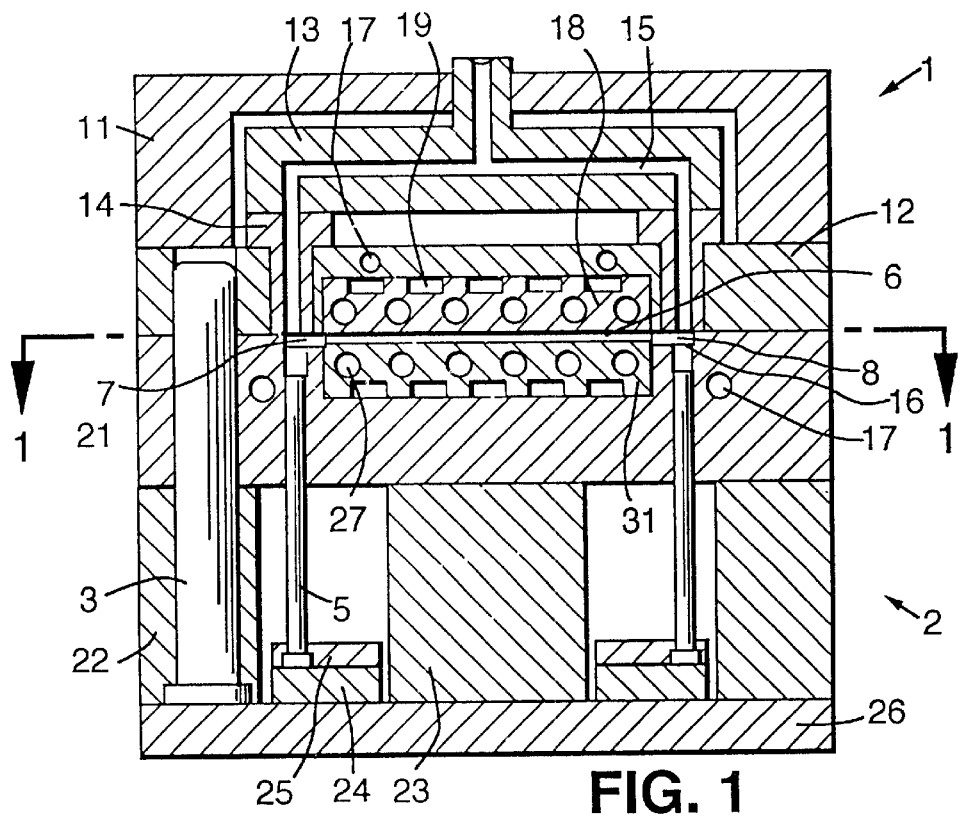
FIG. 1 shows in cross-sectional view a single-cavity injection mold of the present invention, with 2 opposing edge gates and machined-in mold cooling channels for circulating heat transfer fluid.

Refer to FIG. 1. An injection mold of the present invention is shown in cross-section view. Its movable half (2) is mounted onto the movable platen of the injection molding machine (not shown), which operates a conventional ejector assembly, consisting of ejector pins (5) located under each gate (for clean push-out without contacting optically-usable areas of the molded part) and held by ejector cover plate (25) and ejector plate (24). Its fixed half (1) is mounted onto the stationary platen of the injection molding machine (not shown), whose nozzle is in fluid communication with the mold's melt channel (15) within the hot runner manifold (13), and melt enters the mold cavity (6) through opposing gates (7) & (8). At the plane of the parting line (Section 1-1), the mold cavity (6) is formed by opposing mold cavity support blocks, (18) on the fixed moldhalf & (31) on the movable moldhalf.

On each injection molding cycle, the mold is opened and closed along the parting line by an injection molding machine (not shown), guided by leader pins (3). The mold cavity support blocks (18) & (31) are preferably made of the copper alloys, earlier described in more detail. The mold cavity support blocks are mechanically supported and housed within a stationary moldhalf (1) and a moveable moldhalf (2). Note that for optimum results it is desired to create dead air space (19), to the extent possible without giving poor mechanical rigidity/support to the mold assembly, between the mold cavity support block (18) and its supporting mold half (1) by means of thermal isolation. Importantly, note that whereas the mold cavity support block's (31) heat transfer fluid circulation channels (27) are alternately filled with relatively hotter and relatively colder heat transfer fluids within each individual molding cycle, the supporting moldhalf (2) is fitted with flow channels (17) through which heat transfer fluid may also flow, but that these moldhalf flow channels are preferably supplied by an independent source (not shown) of heat transfer fluid maintained, to the extent possible, at a constant temperature ("isothermal") throughout the whole molding cycle. This constant temperature is characteristically less than the heat transfer fluid temperature flowing in mold cavity support block channel (31) at the "heating phase" (at the start of each individual molding cycle), but that the fluid temperature in moldhalf flow channel (17) will be greater than the heat transfer fluid temperature within molding cavity mold cavity support block flow channel (27) after the process control unit has transferred from the "heating phase" to a "cooling phase". An alternate but less preferred embodiment not shown in FIG. 1 has NOT located the heat transfer fluid circulation channels within the opposing mold cavity mold cavity support blocks (18) & (31), but rather within one or more support plates having a mating-contoured-surface onto which opposing mold cavity mold cavity support blocks can be removably mounted (for easier changeover), whereby intimate thermal contact is maintained therebetween. Such alternate but less preferred embodiment will generally have slower heat transfer and poorer thermal diffusivity, of course.

In the case of optical lenses, their molding surface is typically highly lapped and smoothly polished surfaces which may be electroplated with chrome or nickel, or vacuum hardcoated with TiN toolcoatings for wear resistance. Alternatively, where a microstructure consisting of a repeating pattern of prismatic elements or spherical lenslets is desired to be replicated onto the molded part, at least one of the molding surfaces (or both) may be firstly plated with several thousandths of an inch thickness of an electroless nickel (preferred composition: greater than 12% P), then secondly, using diamond turning to machine into the electroless nickel plated layer the desired mirror-image microstructure (adding in a % shrinkage factor to such calculations). Yet another especially preferred embodiment of the present invention has at least one (and possibly both) inward-to-the-mold cavity faces of the support blocks fitted with a thin nickel electroform (removably mounted thereto), which then acts as a partforming surface onto which the molded plastic will replicate itself. Such nickel electroform "stampers" (not shown) can vary widely in geometry and thickness. Typically for the essentially planar microstructure with micron-sized depths, such nickel electroform "stampers" are only 0.012" thick (0.3 mm)). But extremely deep microstructure such as certain fresnel concentrically-faceted lenses with large facet depths may need to have much thicker nickel electroform "stampers".

Consider an example of how the present invention solves the problems that the prior art cannot. "Underfill" (lack of fidelity) at the very tips of the dead-sharp "knife edge" facets on any fresnel lens configuration will produce poor optical transmission, a functional (not cosmetic) problem. The problem is seen when the lens is cut into cross-section, then these tips are examined under the microscope. Any measurable "radiusing" or rounding of what is supposed to be a sharp "knife edge" facet tip is unacceptable, its light-bending performance will be inadequate to meet the design intent. Under the best of conditions, injected melt will have a hard time to fully fill out or replicate such a deeply grooved sharp corner configuration. For this reason, prior art ways for injection molding always failed this test, and so such parts needed to be compression molded, which takes very long cycle times and is more labor intensive. Then came Applicant's U.S. Pat. No. 5,376,317. With it, less-deeply-faceted fresnel concentrically-faceted lenses of smaller size could be molded on short automatic cycles in a conventional injection molding machine, not a compression press manually loaded & unloaded by an operator. However, even with it, more-deeply-faceted fresnel concentrically-faceted lenses of a large size (perhaps 1 foot square or larger) could not be completely successful in avoiding such "underfill" at the very tips of the "knife edge" facets. This was found to be especially true for the ½ of the meltflow pathlength which is away from the single edge-gate (center gating isn't possible for any fresnel concentrically-faceted lens configuration, as the very center must be both cosmetically and optically perfect). Further examination in such underfilled tips of more-deeply-faceted fresnel concentrically-faceted lenses of a large size showed proper filling was easier for the ½ of the meltflow pathlength which is nearest to the single edge-gate. Thus, the cross-sectional asymmetry of the space between the facets of such fresnel concentrically-faceted lens is found to be easier to fill when the meltfront comes from the vertical side of the facet, and conversely harder to fill when the meltfront comes from the angled non-vertical side of the facet. So, for any single edge-gated prior art approach, even Applicant's U.S. Pat. No. 5,376,317 this underfill problem of imprecise surface detail was found for the ½ of the meltflow pathlength which is farthest away from the single edge-gate. But if one were to try to simply solve this problem by adding a second edge-gate at a location across the mold cavity from the first edge-gate, then a very visible surface flaw which is cosmetically rejected is always formed where these 2 meltfronts meet and form their knitline. This was found to be true of any "isothermal" process, even when higher mold & coolant temperatures (still below Tg), higher melt temperatures, faster injection rates, and higher packing pressures were used. Also, even when Applicant's U.S. Pat. No. 4,828,769 pre-enlarged variable-volume mold cavity type of injection-compression molding process was run, still the same problem. However, when Applicants experimentally combined this addition of a second edge-gate at a location across the mold cavity from the first edge-gate, then ran the "non-isothermal" process steps of Applicant's U.S.

Pat. No. 5,376,317 with substantially simultaneous injection through both gates (a preferred embodiment), the previous underfill problem of imprecision surface detail was no longer found for the ½ of the meltflow pathlength which is farthest away from the original single edge-gate, and no visible surface flaw or knitline (when inspected under normal lighting with the unaided eye, without using magnifying aids) was found, and so these lenses were not cosmetically rejectable. Only under polarized light was an internal weld-line seen, where these 2 meltfronts meet.

Figure 2:
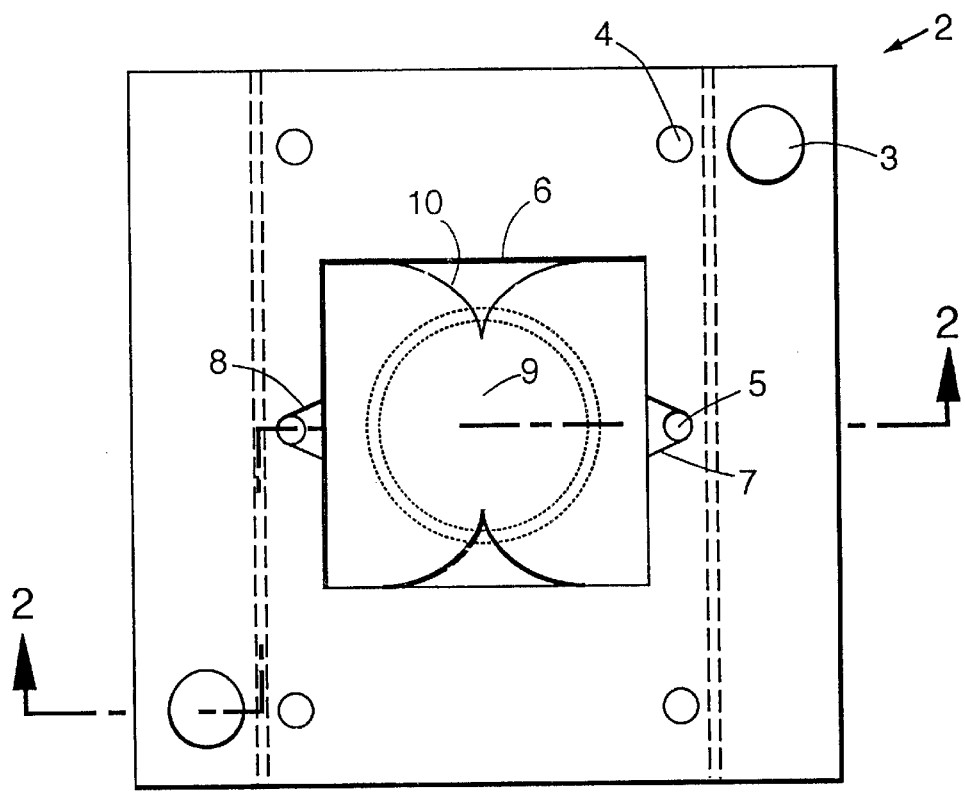
FIG. 2 shows in a plan view (into an open parting line) this single-cavity injection mold of the present invention, with 2 opposing edge gates and machined-in mold cooling channels for circulating heat transfer fluid. Note the intersection of the 2 meltfronts partway through the filling step, as melt is being injected from each of the 2 opposing edge gates.

FIG. 2 shows in a plan view (into an open parting line) this single-cavity injection mold of the present invention, with 2 opposing edge gates and machined-in mold cooling channels for circulating heat transfer fluid. For our example of the more-deeply-faceted fresnel concentrically-faceted (pictured as 2 concentric dotted-line rings) lenses of a large size, we show the original single edge-gate (7), in a fan-gate design (located over ejector pin (5)), and addition of a second edge-gate (8) at a location across the mold cavity from the first edge-gate. For best results, both gates should inject a balanced (substantially equal) flowrate of melt and be started substantially simultaneously through both gates. As shown in this example, at the ideal balanced fill from 2 gates, the first intersection of the 2 meltfronts will be located at the center of the fresnel concentrically-faceted lens, then this juncture of merged meltfronts moved outward toward the perimeter, as shown, at a point more than halfway through the filling step. This is a preferred way, because it eliminates the problem of trapped gases as the lens' very center, which must be both cosmetically and optically perfect. So, this preferred pattern of balanced filling can be seen also as a way to improve venting by "inside-out" filling, so as to driving gases out toward the mold cavity perimeter, where abundant venting is possible (vs. in its center, where venting passageways cannot be located, without making an objectionable surface flaw within the usable optical area of the molded part).

See now FIG. 3, which shows in cross-sectional split view a preferred but optional embodiment of our single-cavity injection mold of the present invention, with its 2 opposing edge gates and machined-in mold cooling channels for circulating heat transfer fluid. To reduce geometric constrictiveness during filling of the mold cavity, an injection compression process sequence with pre-enlarged variable-volume mold cavity is shown. In the lefthand split view, the mold is seen before injection starts, with a greatly increased mold cavity height. In the righthand split view, the mold is seen after injection starts, with the mold cavity height having been compressed toward original dimensions during or after injection. Means for forming such pre-enlarged variable-volume mold cavity and various alternative driving forces and timing sequences for the compression stroke are disclosed in Applicant's U.S. Pat. Nos. 4,828,769 (method) & 4,900,242 (apparatus), also incorporated herein by reference. FIGS. 2–8 show such molds in their various steps within a single molding cycle, and its operation described in columns 25–29. Unlike "isothermal" optical disc or lens molding processes described, wherein the timing between injection and compression steps can be critical to best optical and cosmetic quality of the molded part, in the present invention's "non-isothermal" process, it has been found that timing between injection and compression steps is not so critical to best optical and cosmetic quality of the molded part. Specifically, Applicants' U.S. Pat. No. 4,828,769 (method) specifys that compression should be started before injection is ended. When a pre-enlarged variable-volume mold cavity is run in an injection compression process sequence under "isothermal" mold temperature conditions, an objectionable "parison line" is seen when optical disc or lens molding processes when compression was started AFTER injection is ended. However, in the present invention's "non-iosthermal" process, both types of timing between injection and compression steps can make satisfactory optical and cosmetic quality of the molded part. So, in an optical but less preferred embodiment, the compression step starts after injection is ended & no more melt is entering the mold cavity.

FIG. 4 shows in a plan view (into an open parting line) a single-cavity injection mold of the prior art, with only 1 conventional design edge gate. Note the single half-moon-shaped meltfront (10) is partway through the filling step, as melt is being injected from the single edge gate (8). For our example of the more-deeply-faceted fresnel concentrically-faceted (pictured as 2 concentric dotted-line rings) lenses of a large size, we show the single edge-gate (8) in a fan-gate design. Any "isothermal" process will still have "underfill" at the facet tips, both facing into and away from the approaching meltfront, even when higher mold & coolant temperatures (still below Tg), higher melt temperatures, faster injection rates, and higher packing pressures were used. Also, even when Applicant's U.S. Pat. No. 4,828,769 pre-enlarged variable-volume mold cavity type of injection-compression molding process was run, still the same problem. With the "non-isothermal" process steps of Applicant's U.S. Pat. No. 5,376,317, the underfill problem of imprecision surface detail was no longer found for the ½ of the meltflow pathlength which is closest to the single edge-gate, but not solved for the ½ of the meltflow pathlength which is farthest away from the single edge-gate.

As previously mentioned, the materials of construction of the mold cavity support block need to be of sufficient mechanical loadbearing strength and thickness to exceed deflection forces exerted by the peak packing melt pressure without being internally pressurized within the coolant channels, and desirably of very high thermal conductivity to be suitable for rapid thermodynamic change, which is necessary if a minimal molding total cycle time is to be attained. Copper based high strength mold alloy materials are preferred, and one optional embodiment would be use of Applicant's U.S. Pat. No. 4,793,953 herein incorporated by reference, or functional equivalence thereof. The mold cavity support block is preferably fitted directly with heat transfer field circulating channels, but within a single monolithic piece of high conductivity metal. However, a less preferred embodiment would place a high conductivity mold element into an assembly joined mechanically or adhesively to a backing plate wherein the channels for circulating heat transfer fluid could be housed.

Figure 5:
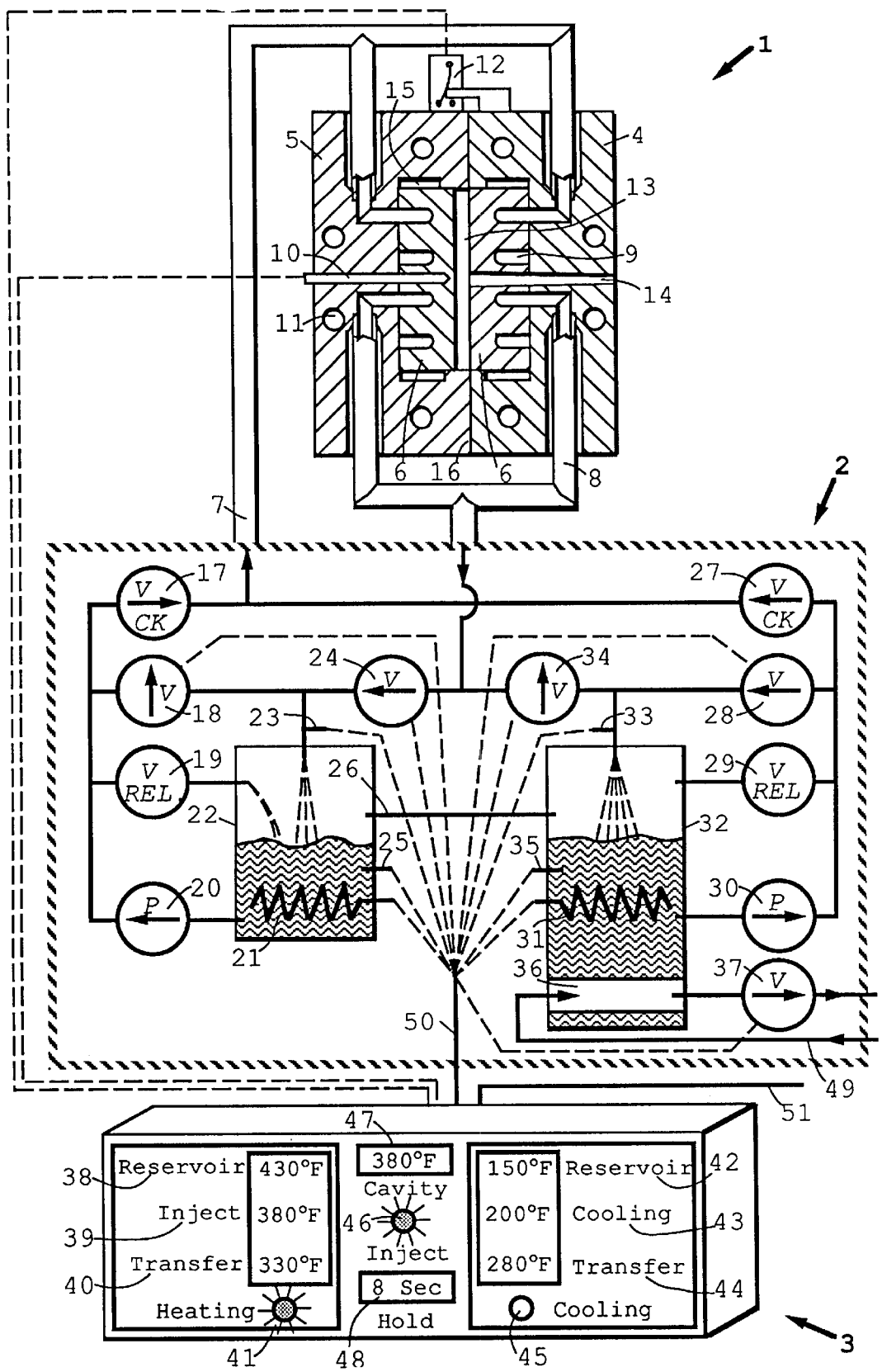
FIG. 5 shows in cross-sectional view an injection mold of the present invention, with heat transfer fluid plumbing and electronic control circuitry shown in schematic form, connected to a process controller device.

FIG. 5 shows in cross-sectional view an injection mold of the present invention, with heat transfer fluid plumbing and electronic control circuitry shown in schematic form, connected to a process controller device. Look now at the fluid control unit (2), showing a schematic diagram of the heat transfer fluid supply system which feeds into supply line (7) to the injection mold (1) and out of injection mold (1) by fluid return line (8). Supply line (7) is shown feeding into both mold halves and both cavity mold cavity support blocks (6), but it would be obvious to provide at least 2 such fluid control unit (2) so that each moldhalf and mold cavity support block could be maintained independently—conventional demolding practices assist part removal of running one moldhalf colder than the other throughout the whole cycle just so one side of the molded part shrinks more than the other by the time the mold is opened to eject the part. Similarly, return lines (8) allow the cyclic heat transfer fluid to exit both mold cavity mold cavity support blocks and mold halves.

Looking at the fluid control unit (2), on the left hand side of the center line we see the "hot side" (which is activated during the heating phase of each injection molding cycle), including a heat transfer fluid supply system (22) being maintained at a higher fluid temperature than a maximum surface temperature of the mold mold cavity support blocks, plumbed with and outlet line which passes through a pump (20) in turn plumbed with 3 valves:

1. A check valve (17) to prevent backflow from the supply line (7) which feeds into the injection mold (1).
2. A control valve (18) operating under electronic control of the process control unit (3) through control wire (50). When control valve (18) is in its closed position (as shown here, during the heating phase of the molding cycle), then the pumped fluid is forced to feed the mold and is prevented from returning to the supply system, but when the control valve is opened (not shown here, during the cooling phase of the molding cycle), the "hot side" heat transfer fluid seeking the path of least resistance will dump into the "hot side" supply system (22), and the supply line (7) feeding into the mold will become pressurized by pump (30) by "cold side" heat transfer fluid supplied from "hot side" supply system (32).
3. Relief valve (19) will only open when high pressure in the supply line is reached which exceeds the preset value for the relief valve, thereby dumping heat transfer fluid back into the heated supply system.

The supply system is heated by means of heating element (21), which operates under the electronic control of the process control unit through wire (3) through wire (50) (note temperature sensor (25) connected by control wire (50) to process control unit (3).)

Turning now to the right hand side of the fluid control unit (2), we view the "cold side" of the system (which is activated during the cooling phase of each injection molding cycle), including supply system (32) storing heat transfer fluid maintained at a lower fluid temperature than a minimum surface temperature of the mold mold cavity support blocks (note temperature sensor (35) connected by control wire (50) to process control unit (3). In addition to heating element (31), a heat exchanger (36) is operated under the control valve (37), to either increase, reduce, or eliminate entirely cooling water flow which acts to bring down the fluid temperature within supply system (32), under the control of process control unit (3) through cooling water supply line (49).

In operation, during the cooling phase of the molding cycle, pump (30) feeds heat transfer fluid through check valve (27) into supply lines (7). As shown in FIG. 1, the mold is in the heating phase and not in the cooling phase, therefore control valve (28) is shown in the open position, wherein the heat transfer fluid is diverted away from supply line (7) and is dumped back into the supply system. Similarly, as similar to the case with the hot side, control valve (28) is wired by control wire (50) into the process control unit, as is also the fluid return line with temperature sensor (33) (23 for the hot side). When control valve (34) is shown in the closed position, return line (8) feeds heat transfer fluid coming from the mold into the hot side through its control valve (24) (shown in the open position) and not into the cold side, since control valve (34) is shown in its closed position. Control valves (24) and (34) are wired by control wire (50) to the process control unit (3), and work in opposition to each other.

Look now at process control (3), shown with typical value settings characteristic of the heating phase of the molding cycle. Indicator light (41) is shown lit up, which means that heating is going on at this time (similarly, indicator light (45) is shown not lit up, which means that cooling is not being done at this time). Temperature sensor (25) provides the heat transfer fluid temperature within the hot side supply system, and similarly temperature sensor (35) provides the heat transfer fluid temperature within the cold side supply system (32). Settable temperature (38) for the fluid in the hot side supply system (22) is shown, in this example, at 430 degrees F. Actual mold surface temperature (displayed as (47)) is read by cavity mold cavity support block temperature sensor (10), and compared against a settable "minimum temperature" value (39) (at least=Tg or Tm for the thermoplastic), and the control logic requires that at least this minimal value be read by the temperature sensor (10) before injection is allowed to start. In this example of a polycarbonate optical lens with Tg=296 F., the settable mold surface temperature reading from sensor (10) must be at least 380 degrees before start of injection is allowed.

Cavity mold cavity support block temperature sensor (10) could be any conventional thermocouple (Type J, Type K, etc) but is preferably a faster-responding (0.001 second or less) thermister. Sensor (10) should be mounted within the mold cavity mold cavity support block in a position very close to that partforming surfaces to be wetted by the molten polymer (about 0.100" or 2.5 mm setback distance is recommended). Sensor mounting can be any of the following; surface mounting, bayonet lock, magnetic probe; removable or permanent.

Settable transfer temperature (40) is shown here at 330 degres F. When the heat transfer fluid temperatures sensed by sensor (23) in the return line feeding hot side supply system (22) falls below this set point (in this example, 330 degrees F.), then the process control unit (3) sends a signal through control wire (50) to flow return control valve (24) to close, and valve (34) is opened to divert the return flow of heat transfer fluid into cold side supply system (32).

Holding temperature settable time value (48) shows the time from the "mold-closed" signal from sensor (12) ("time=0") before the heating phase is ended (by opening control valve (18)). In this example, the setting value shown is eight seconds. That means that for eight second after start of injection, control valve (18) is closed and thus, after the timer exceeds this settable time delay value, then control valve (18) opens and bypasses heat transfer fluid away from supply line (7) back into hot side supply system (22), thus bypassing the mold. Actual mold cavity temperature sensed by sensor (10) is displayed in temperature reading (47) (in this example, shown at 380 degrees F.).

Depending upon actual choice of mold materials and temperature differentials, this starting point ("time=0") can be retarded (i.e. a settable delay time AFTER "mold-closed" signal from sensor (12)) or advanced (i.e. start timer at start of "clamp decompression" or "start of mold opening" or off a robotic part-verification "mold-clear" signal, all of which start BEFORE "mold-closed" signal from sensor (12)). It would be an obvious functional equivalent to use one of these alternative means for triggering start of the "heat-on" and or "timer-start-for-transfer" instead of this preferred embodiment.

Looking now at the right hand or cold side of the process control unit, supply system temperature settable value (42) shows the desired supply system temperature (in this example 150 degrees F.). When the sensor (35) is reading higher temperatures than temperature setting (42), then the process control unit increases the flow rate through heat exchanger valve (37) to increase the rate of heat removal out of supply system (32).

Cooling mold temperature value (43) can be set for determining when to open the mold and eject the part, at a point where (47) is sufficiently below Tg for the plastic's temperature (not easily directly measured) to be shape stable; shown here in this polycarbonate optical disk example at 200 degrees F. Importantly, this is substantially lower than the "control band" range of mold & coolant temperatures desired in conventional optical disk molding, which chooses a mold & coolant temperature between 240–265 F., and once set, the conventional optical disk molding process attempts to maintain this set value + or −5 degrees F. throughout the whole molding cycle, wherein typically best optical disk properties are obtained by these conventional processes and apparatus employing only one fluid supply system operating at only one temperature setpoint throughout each molding cycle.

Settable temperature value for onset of transfer from return line (8) fluid back to supply system for the temperature sensor (33) shows a value of 280 degrees F. When this value is exceeded, control valve (34) is closed and will not permit returning fluid to enter.

In actual operation being shown, the molded thermoplastic part has been removed from the open mold and the injection molding machine has just closed the two mold halves together to seal the parting line (16), which is confined by limit switch (12), which then signals process control unit (3) that a new injection molding cycle may now start. In practice, if and only if actual mold surface temperature (47) is at least equal to the settable value (39) for start of injection (in this case, both (47) and (39) equal at least 380 degrees F.), then molten thermoplastic is injected through sprue (14) into mold cavity (13).

Figure 6:
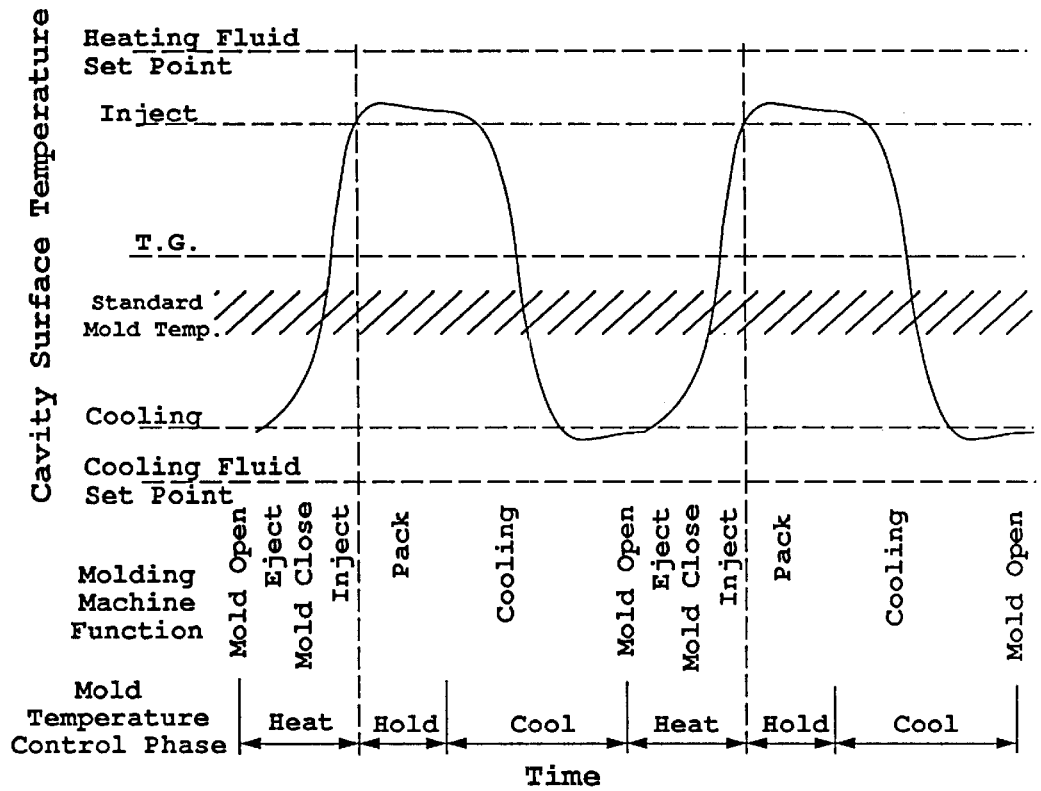
FIG. 6 shows the changing mold cavity surface temperature as a function of changing molding process sequence of the present invention.

FIG. 6 shows the changing mold cavity surface temperature as a function of changing molding process sequence of the present invention. It shows that as the mold is opened and the molded article is ejected, the limit switch (12) signalling mold opening can be used to trigger start of heating phase, while the molded part is being ejected and the mold is again closing. (Even before actual mold opening motion trips the limit switch, it may be desirable to start heating phase BEFORE clamp decompression is started). As mold surface temperature rises up to the required minimum setpoint, heating continues, then once the desired setpoint is reached, injection can start. Sometime after the injection is ended and packing has commenced, the mold surface temperature may be allowed to fall without reducing the surface replication and quality of the molded plastic part.

In actual practice, because of the delay time, it is possible that hot side fluid pumping may be stopped at or before the start of injection even, due to this induction time or delay time effect. What counts, of course, is the mold cavity surface temperature which is seen by the plastic; as long as it remains sufficiently high so that the polymer molecules are not prematurely set in place near the mold surfaces, then high fidelity replication can occur. As shown in FIG. 6, the settable value for start of injection is substantially above Tg and is preferably maintained there sufficiently long to assure peak cavity melt pressures have at least been attained before mold surface temperature is allowed to drop quickly by means of onset of pumping cold side heat transfer fluids. Once active cooling is started, the mold surface temperature drops quite quickly, due to high conductivity materials and thermal isolation away from the thermal-cycling mold cavity support blocks, and good proximity of the flowing coolant to the molding surfaces wetted by the molten plastic polymer.

Figure 7:
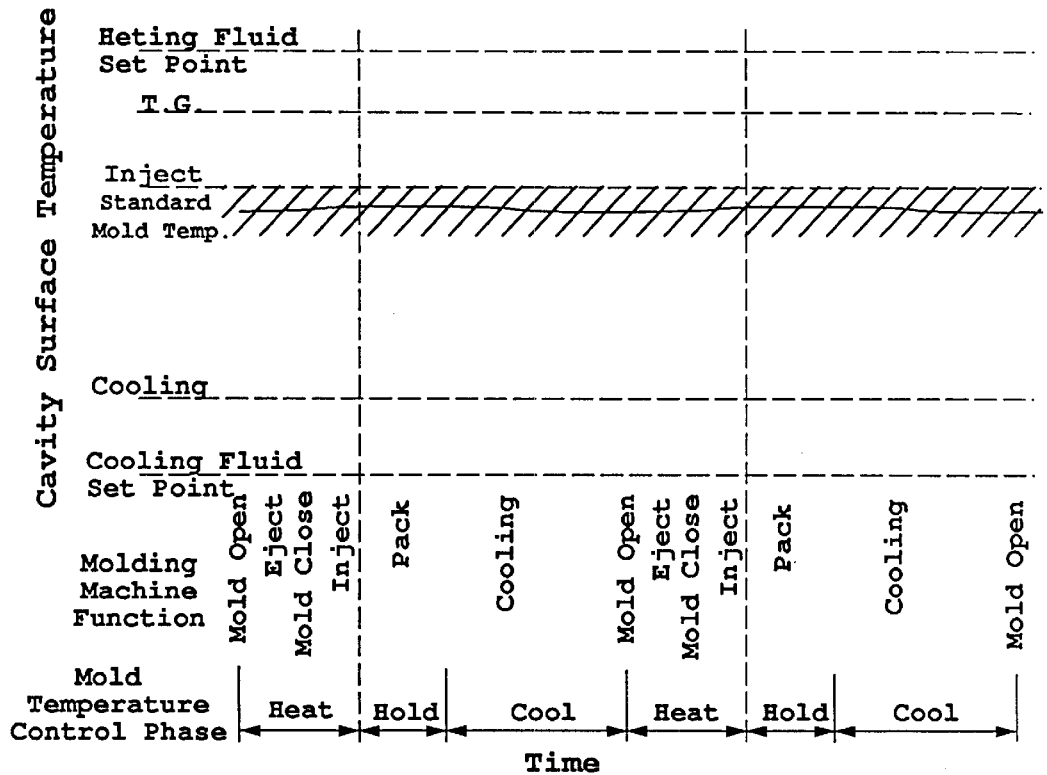
FIG. 7 shows a "prior art" embodiment, of a "conventional cooling" process, wherein by intentions the inlet fluid temperature into the mold cavity is maintained within a tight range of temperature, with minimum change within each molding cycle being desired.

FIG. 7 shows a "prior art" embodiment, of a "conventional cooling" process, wherein by intentions the inlet fluid temperature into the mold cavity is maintained within a tight range of temperature, with minimum change within each molding cycle being desired. In contrast to FIG. 6, FIG. 7 shows actual cavity surface temperature never reaches Tg or Tm and fluctuates between a lower temperature during cooling phase and a warmer temperature when the mold is being heated by the hot plastic. The important thing to note is that the transfer fluid temperature is deliberately maintained substantially constant throughout each injection molding cycle individually. This "isothermal" process is in contrast to the present invention, which exceeds the Tg temperature at the time when injection is to start, then switches over to a much lower temperature heat transfer fluid during the actively cooling stages.

Figure 8:
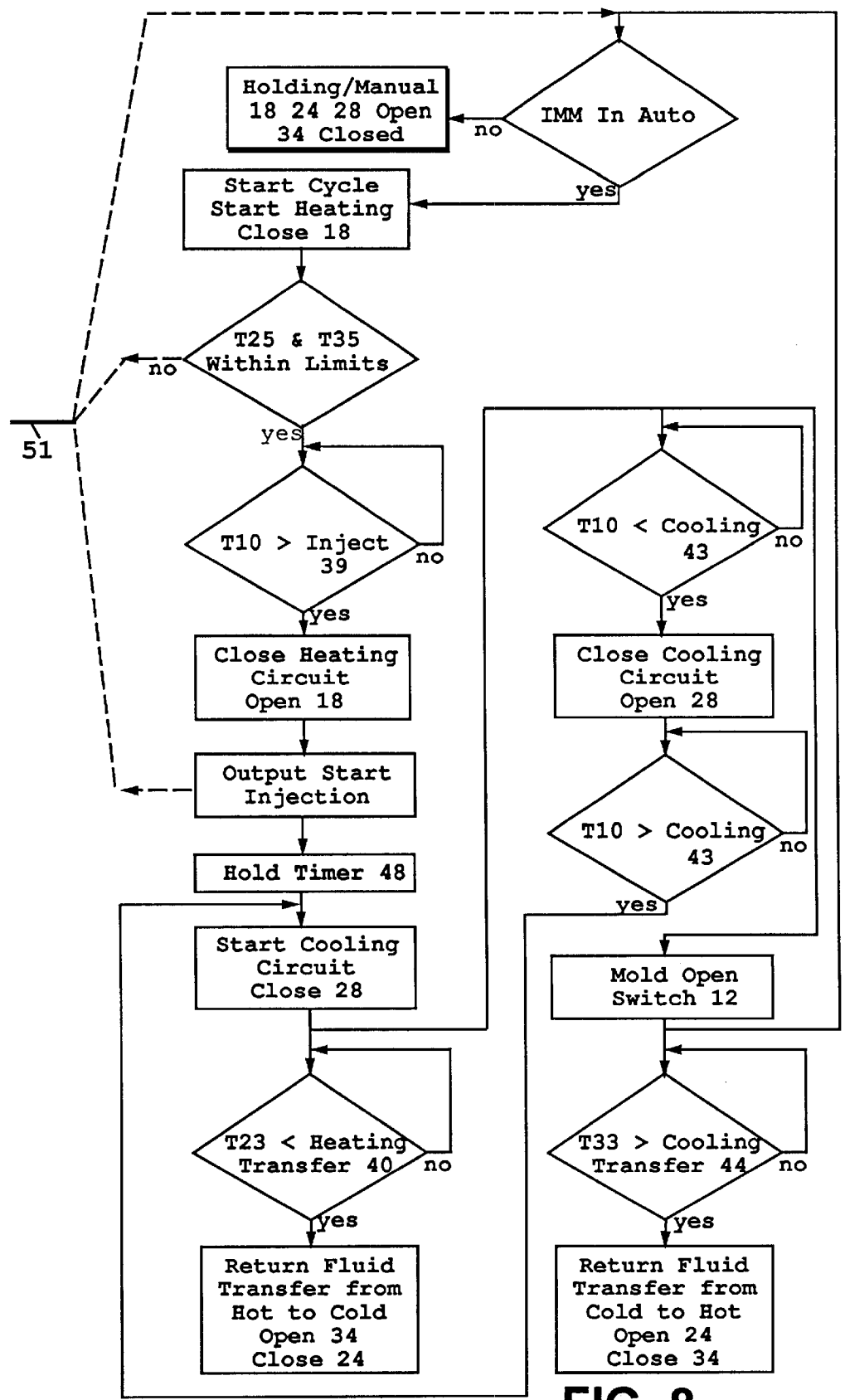
FIG. 8 shows the process flow sheet with the decision tree logic necessary for the process control device to operate.

FIG. 8 shows the process flow sheet with the decision tree logic necessary for the process control device to operate. First, when in "standby" (non-production), the injection molding machine is in "manual mode", with valves (18), (24) and (28) open and (34) closed. To transfer into production, the injection molding machine is switched over to "automatic cycle", as shown at the top of the page. The heating cycle is started at least as soon as the mold is opened (as sensed by limit switch sensor (12)), and heating is started by closing control valve (18). Once temperatures (25) and temperatures (35) are within the set limits, and the actual mold surface temperature (T10) at least equals if not exceeds the settable value (39) inject, then injection is permitted to start. If not, then heating continues until the setpoints are reached (it is possible to add a timer which would sound an audible alarm if an abnormally long time interval has passed due to some malfunction). The next step is to close the heating circuit opening control valve (18) to stop flow from the "hotside" supply system into the mold through supply lines (7). This is done as soon as injection has started, or could alternatively be delayed by some predetermined way. (In this preferred embodiment shown in FIG. 3 the heating circuit is essentially closed simultaneously to the start of injection, in order to minimize total cycle time, but a longer heating phase could be run without harm to quality of the molded plastic, if one is willing to reduce output quantity with this longer total molding cycle time.) At typically the same time, the hold timer (48) is started and after that settable value for time is attained, then start of the cooling phase is initiated by closing valve (28). Note that FIG. 3 shows these steps in a sequential, serial order, but it would be obvious to those skilled in the art to minimize cycle time by performing concurrently (i.e. in parallel) those steps which are not specifically contingent upon an outcome or measurement preceeding it.

Transfer of heat transfer fluid from the return line (8) depends on whether sensed temperature from sensor (23) reads less than the heating transfer temperature value (40). It not, then cooling is continued as before. If so, then the return heat transfer fluid is diverted from the hot to the cold side supply system by opening control (34) and closing control valve (24). Next, if the actual mold surface temperature T10 is less than the prescribed value for cooling setpoint (43), then move ahead to close the cooling circuit by opening control valve (28). If T10 is less than cooling setpoint (43), then continue through previous step. When T10 is greater than cooling setpoint (43), then go back to start the cooling circuit by closing valve (28) again. When that happens, in parallel to it, the mold is opened as sensed by limit switch (12), then the next step starts. Recycle loop checks to see that the injection molding machine is still in automatic mode, then closes valve (18) to start heating again. Only when sensed temperature from sensor (33) is greater than the settable value for cooling transfer (44), then the heat transfer fluid from return line (8) is diverted away from the cold side supply system (32) and over to hot side supply system (22) by opening control valve (24) and closing control valve (34).

In case there is imbalance in the total flows out of and into each supply system, there is an interconnect line (26) between supply systems (22) and (32), such that if the liquid level of either supply system rises to that point, then gravity transfer will spill over the excess heat transfer fluid from into the other. Note that both supply systems are maintained at atmospheric pressure, in the case of oil or glycol being used as the heat transfer fluid. (Not applicable in the case of the optional but preferred use of steam; excess condensate or cooling water can be dumped if need be, if imbalanced flow happens. Those skilled in the art of steam generation and plumbing would make suitable accomodation). This simple self-equilibrating, self-adjusting heat-transfer-fluid-level-balancing apparatus is one embodiment, but it could be replaced by standalone electronic level controls in fluid communication with optional auxillary 3rd ("mixed hot+cold" supply system) and/or 3rd+4th fluid supply systems (i.e. separate backup hotside and coldside supply system). Also, substitution of a 3-way valve for the combination of control valves 24+34, governing the return of fluid to the supply systems. Return lines exiting the mold could optionally deliver the returning heat transfer fluid into a third supply system which in turn is maintained in fluid communication with both hot side heating supply system and cold side cooling supply system. These examples show how the present invention can be implemented by several alternative means, & should not be limited to just this hardware as illustrated in FIG. 1.

We claim:

1. A method for injection molding thermoplastic articles having no objectionable knitline at a meeting of meltfronts within a useable portion of said thermoplastic article having been molded within an injection mold having at least one mold cavity formed between opposing mold cavity support blocks, said mold cavity support blocks being constructed of high thermal conductivity metal alloy, said mold cavity support blocks being constructed of sufficient thickness to resist unacceptable mechanical deflection when maximum melt pressure is being exerted during a packing stage of a molding cycle, said mold cavity support blocks being maintained in thermal conductive contact with a heat transfer fluid circulating within channels entering to and exiting from the injection mold by means of supply lines and return lines plumbed to a fluid control unit having at least two heat transfer fluid supply systems capable of being heated or cooled under control of an electronic process control unit, at least one hot side supply system being maintained at a higher fluid temperature than a settable maximum surface temperature of said mold cavity support blocks, said maximum surface temperature being greater than a temperature at which the thermoplastic is a form-stable solid, and at least one cold side supply system being maintained at a lower fluid temperature than a settable minimum surface temperature of said mold cavity support blocks, said minimum surface temperature being less than a temperature at which the thermoplastic is a form-stable solid, said mold cavity having a plurality of substantially opposing edge gates suitable for feeding in injected molten thermoplastic so as to reduce meltflow distance and thereby reduce aspect ratio during filling of said mold cavity, so as to produce a meeting of meltfronts within a useable portion of said thermoplastic article when injection is started substantially simultaneously from each of said plurality of substantially opposing edge gates, comprising the steps of:

a. heating opposing partforming surfaces of said mold cavity support blocks by said fluid circulating from said hot side supply system, until an actual mold temperature as measured by a temperature sensor mounted therein reads at least a predetermined setpoint temperature settably chosen to retard solidification rate of said thermoplastic;

b. injecting said molten thermoplastic from each of said plurality of substantially opposing edge gates, into the mold cavity formed within the injection mold, while said actual mold temperature is at least equal to said predetermined setpoint at least until said meeting of meltfronts within a useable portion of said thermoplastic article has been attained during the filling of the mold cavity with said molten thermoplastic;

c. transferring from a heating phase to a cooling phase;

d. cooling the mold until said actual mold temperature is below the temperature at which the thermoplastic is a form-stable solid;

e. opening the mold along a parting line and removing said thermoplastic article and transferring from a cooling phase to a heating phase, in preparation of the start of the next injection molding cycle.

2. A method of claim 1, wherein during the step of injecting said molten thermoplastic from each of said plurality of substantially opposing edge gates, a. a second edge-gate has been located across the mold cavity from a first edge-gate, and b. both gates inject a balanced, substantially equal flowrate of melt, and c. injecting is started substantially simultaneously through both gates, such that a first intersection of the 2 meltfronts will be located substantially at the center of the molded article, at a point substantially equidistant from the 2 opposing edge-gates.

3. A method of claim 2, wherein after this first intersection of the 2 meltfronts has occurred and balanced "inside-out" filling continues, a merged meltfront moves outward toward the perimeter, to improve venting by driving gases out toward the mold cavity perimeter, where abundant venting is possible.

4. A method of claim 1, wherein steam is the heat transfer fluid circulating within said at least one hot side supply system being maintained at a higher fluid temperature than a settable maximum surface temperature of said mold cavity support blocks, said maximum surface temperature being greater than a temperature at which the thermoplastic is a form-stable solid, and liquid water is the heat transfer fluid circulating within said at least one cold side supply system being maintained at a lower fluid temperature than a settable minimum surface temperature of said mold cavity support blocks, said minimum surface temperature being less than a temperature at which the thermoplastic is a form-stable solid.

5. A method of claim 1, wherein an injection compression process sequence starts with formation of a pre-enlarged variable volume mold cavity before injection starts, then said pre-enlarged variable volume mold cavity is secondly compressed toward original dimensions during injection or after injection is ended, by steps of:

a. heating opposing partforming surfaces of said mold cavity support blocks by said fluid circulating from said hot side supply system, until an actual mold temperature as measured by a temperature sensor mounted therein reads at least a predetermined setpoint temperature settably chosen to retard solidification rate of said thermoplastic, and said mold cavity formed between opposing mold cavity support blocks is pre-enlarged before start of injection, by increasing a mold cavity height dimension by means of increasing distance between said opposing mold cavity support blocks, so as to reduce aspect ratio during filling of said mold cavity and thereby to reduce geometric constrictiveness during filling of said mold cavity, and;

b. compressing said pre-enlarged mold cavity formed between opposing mold cavity support blocks, by decreasing a mold cavity height dimension by means of decreasing distance between said opposing mold cavity support blocks, either during or after injecting said molten thermoplastic from each of said plurality of substantially opposing edge gates, into the mold cavity formed within the injection mold, while said actual mold temperature is at least equal to said predetermined setpoint at least until said meeting of meltfronts within a useable portion of said thermoplastic article has been attained during the filling of the mold cavity with said molten thermoplastic.

6. A method of claim 5, wherein the step of compressing is started before injection is ended, and before no more melt enters into said pre-enlarged mold cavity from said plurality of substantially opposing edge gates.

7. A method of claim 1, wherein said thermoplastic is optically transparent and amorphous, said predetermined setpoint chosen to retard solidification rate is at least 10 degrees C. higher than a glass transition temperature characteristic of said thermoplastic, and said temperature at which the thermoplastic is a form-stable solid is the glass transition temperature characteristic of said amorphous thermoplastic.

8. A method of claim 1, wherein said thermoplastic is substantially crystalline, said predetermined setpoint chosen to retard solidification rate is at least equal to a melting point temperature characteristic of said thermoplastic, and temperature at which the thermoplastic is a form-stable solid is the melting point temperature characteristic of said substantially crystalline thermoplastic.

9. A method of claim 1, wherein said actual mold temperature is at least equal to a predetermined setpoint chosen to retard solidification rate, until the mold cavity has been completely filled with said molten thermoplastic and is also further pressurized to a desired level of melt pressure within said mold cavity.

10. A method of claim 9, wherein said fluid temperatures are at least 25 degrees higher than the glass transition temperature or melting point temperature characteristic of the thermoplastic.

11. A method for injection molding optically transparent thermoplastic articles having no objectionable knitline at a meeting of meltfronts within a useable portion of said thermoplastic article having been molded within an injection mold having at least one mold cavity formed between opposing mold cavity support blocks, said mold cavity support blocks being constructed of high thermal conductivity copper alloy having at least 40 BTU/square foot/foot/degree Fahrenheit conductivity and at least 50,000 psi loadbearing compressive yield strength, said mold cavity support blocks being constructed of sufficient thickness to resist unacceptable mechanical deflection when maximum melt pressure is being exerted during a packing stage of a molding cycle, said mold cavity support blocks being maintained in thermal conductive contact with a heat transfer fluid circulating within channels entering to and exiting from the injection mold by means of supply lines and return lines plumbed to a fluid control unit having at least two heat transfer fluid supply systems capable of being heated or cooled under control of an electronic process control unit, at least one hot side supply system being maintained at a higher fluid temperature than a maximum surface temperature of said mold cavity support blocks, and at least one cold side supply system being maintained at a lower fluid temperature than a minimum surface temperature of said mold cavity support blocks, said minimum surface temperature being less than a temperature at which the thermoplastic is a form-stable solid, comprising the steps of:

a. heating opposing partforming surfaces of said mold cavity support blocks by said fluid circulating from said hot side supply system, until an actual mold temperature as measured by a temperature sensor mounted therein reads at least a predetermined setpoint temperature chosen to retard solidification rate of said thermoplastic, said thermoplastic being optically transparent and amorphous, said predetermined setpoint chosen to retard solidification rate is at least equal to a glass transition temperature characteristic of said thermoplastic, and said temperature at which the thermoplastic is a form-stable solid is the glass transition temperature characteristic of said amorphous thermoplastic, and said heat transfer fluid temperature supplied by the hot side supply system is at least 25 degrees centigrade higher than the glass transition temperature characteristic of the thermoplastic, said mold cavity formed between opposing mold cavity support blocks being pre-enlarged before start of injection, by increasing a mold cavity height dimension by means of increasing distance between said opposing mold cavity support blocks, so as to reduce aspect ratio during filling of said mold cavity and thereby to reduce geometric constrictiveness during filling of said mold cavity;

b. injecting into and compressing said molten thermoplastic within said pre-enlarged mold cavity formed between opposing mold cavity support blocks before start of injection, by decreasing a mold cavity height dimension by means of decreasing distance between said opposing mold cavity support blocks, said decreasing a mold cavity height dimension being done either during or after injecting said molten thermoplastic substantially simultaneously from each of the plurality of substantially opposing edge gates, into the mold cavity formed within the injection mold, while said actual mold temperature is at least equal to said predetermined setpoint at least until said meeting of meltfronts within a useable portion of said thermoplastic article has been attained during the filling of the mold cavity with said molten thermoplastic;

c. transferring from a heating phase to a cooling phase by stopping flow of heat transfer fluid from the hot side supply system and starting flow of heat transfer fluid supplied from the cold side supply system, said heat transfer fluid temperature supplied from the cold side supply system being at least 25 degrees centigrade below the glass transition temperature characteristic of the thermoplastic;

d. cooling the mold until said actual mold temperature is below the temperature at which the thermoplastic is a form-stable solid;

e. opening the mold along a parting line and removing the molded optically transparent thermoplastic product and transferring from a cooling phase to a heating phase by stopping flow of heating transfer fluid from the cold side supply system and starting flow from the hot side supply system, in preparation of the start of the next injection molding cycle.

12. An apparatus for injection molding thermoplastic articles, comprising:

a. an injection mold having at least one mold cavity formed between opposing mold cavity support blocks, said injection mold comprising:

(i) a runner system maintained in fluid communication between an injection molding mackine and a plurality of substantially opposing edge gates suitable for feeding in injected molten thermoplastic so as to reduce meltflow distance and thereby reduced aspect ratio during a filling phase of a molding cycle;

(ii) said mold cavity support blocks being constructed of high thermal conductivity copper alloy having at least 60 BTU/square foot/foot/degree Fahrenheit conductivity and at least 50,000 psi loadbearing compressive yield strength, said mold cavity support blocks being constructed of sufficient thickness to resist unacceptable mechanical deflection when maximum melt pressure is being exerted during a packing stage of said molding cycle, (iii) passageways for circulating heat transfer fluids within said mold cavity support blocks being maintained in thermal conductive contact with said heat transfer fluids entering to and exiting from said injection mold by means of supply lines and return lines plumbed to a fluid control unit;

b. said fluid control unit having at least two heat transfer fluid supply systems in fluid communication with said injection mold by said supply lines and return lines, with at least one hot side supply system being maintained at a higher fluid temperature than a settable maximum surface temperature of said mold cavity support blocks, and at least one cold side supply system being maintained at a lower fluid temperature than a settable minimum surface temperature of said mold cavity support blocks, said minimum surface temperature being less than a temperature at which the thermoplastic is a form-stable solid;

c. an electronic process control unit capable of receiving temperature readings from at least one temperature sensor mounted within at least one mold cavity mold cavity support block and from any temperature sensors provided within said supply lines and return lines and said supply systems, and said heat transfer fluid supply systems being capable of being heated under control of said electronic process control unit, such that said process control unit can open and close control valves governing flow of heat transfer fluid within said supply line and said return lines maintained in fluid communication between said fluid control unit and said injection mold, according to a sequence based upon comparison of said temperature readings from said temperature sensor mounted within at least one mold cavity mold cavity support block against a predetermined series of settable temperatures and related time values, thereby determining the start and stop of a heating phase and a cooling phase within each individual injection molding cycle.

13. An apparatus of claim 12, wherein said mold cavity support block is fabricated of a high thermal conductivity alloy and fitted with flow channels suitable for circulating heat transfer fluid.

14. An apparatus of claim 12, wherein at least one of the opposing part forming surfaces of the mold cavity mold cavity support blocks is coated with a harder surface than the high thermal conductivity alloy.

15. An apparatus of claim 14, wherein at least one of the opposing part forming surfaces of the mold cavity mold cavity support blocks is optically polished, and the thermoplastic is an optically transparent grade.

16. An apparatus of claim 12, wherein said high conductivity mold cavity support block is made of a monolithic single piece of high conductivity metal further comprising:

a. a electroplated nickel or chromium face which is hardened and optically polished joined intimately to a substrate, b. said substrate being made from a very high conductivity copper alloy having a compressive yield strength of at least 75,000 PSI.

17. An apparatus of claim 12, wherein a microstructure consisting of a repeating pattern of prismatic elements or spherical lenslets is replicated onto the mold part, by means of at least one of the molding surfaces being firstly plated with several thousandths of an inch thickness of an electroless nickel, then secondly, using diamond turning to machine into the electroless nickel plated layer the desired mirror-image microstructure.

18. An apparatus of claim 12, wherein an electroformed nickel stamper is mounted against at least one of said mold cavity support block surfaces in order to provide precision surface detail onto the molded thermoplastic article.

19. An apparatus of claim 18, wherein said electroformed nickel stamper mounted against at least one of said mold cavity support block surfaces has an essentially planar microstructure with micron-sized depths, said nickel electroform "stampers" being less than 0.040" thick (1.0 mm)).

20. An apparatus of claim 18, wherein said electroformed nickel stamper mounted against at least one of said mold cavity support block surfaces has a more-deeply-faceted microstructure of a concentrically-faceted fresnel lens, with larger facet depth, and thicker nickel electroform "stampers".

21. An apparatus of claim 12, wherein a plurality of mold cavities are formed between opposing pairs of mold cavity support blocks in said injection, each of said plurality of mold cavities being fed melt by a plurality of substantially opposing edge gates.

* * * * *